Aug. 18, 1964
W. BARTOK
3,145,220
METHOD OF OXIDIZING HYDROCARBON FEEDS EMPLOYING
DISCONTINUOUS TRIGGERING MEANS
Filed Nov. 8, 1960
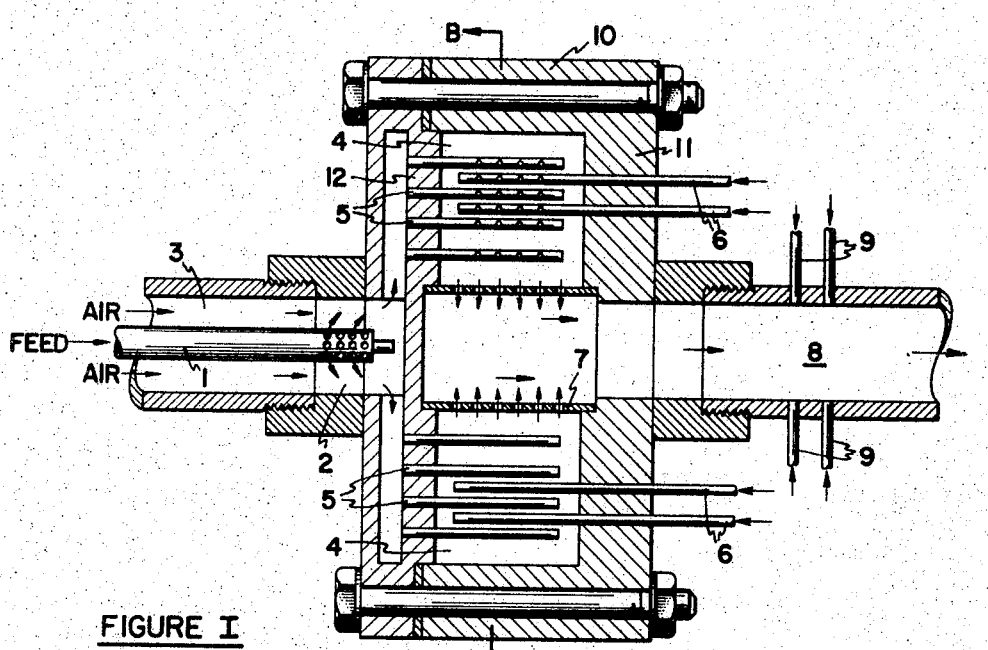
FIGURE I
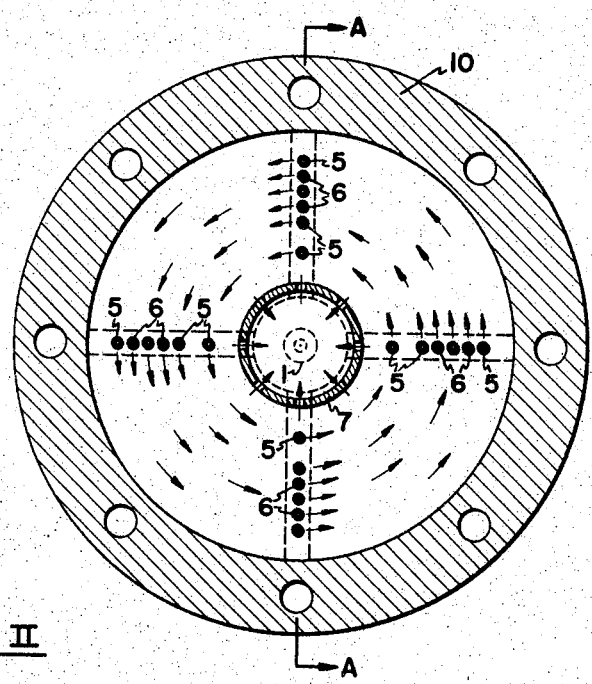
FIGURE II
WILLIAM BARTOK INVENTOR
BY R. D. Manahan
PATENT ATTORNEY 3,145,220
METHOD OF OXIDIZING HYDROCARBON FEEDS EMPLOYING DISCONTINUOUS TRIGGERING MEANS
William Bartok, Cranford, N.J., assignor to Esso Research and Engineering Company, a corporation of Delaware
Filed Nov. 8, 1960, Ser. No. 68,073
2 Claims. (Cl. 260—348.5)

The invention relates to a method of initiating vapor phase oxidation reactions in a reactor, hereinafter referred to as the homogeneous reactor, where rapid mixing of the reactants, intermediates and products takes place to form a homogeneous reaction mixture. More specifically, difficult oxidation reactions are initiated or "triggered" in the homogeneous reactor with more easily oxidizable substances and then the reaction is allowed to proceed in the absence of the initiator.

In the oxidation of organic compounds to useful products the reaction is arrested at the "partial" oxidation stage. A quick and thorough mixing of the reactants is required to prevent the formation of localized hot spots where the reaction can proceed to completion. Energy released in the partial oxidation of a hydrocarbon molecule accelerates its further oxidation unless it is quickly dissipated. It is, therefore, of vital importance that the time of reaction be limited as nearly as possible to the minimum time necessary to achieve the desired conversion.

Various methods and means have been devised in the past. Among these is the "open tube" reactor wherein temperature control is obtained by the use of large volumes of diluent and relatively low conversions per pass. A recent improvement in this art is the "raining solids" reactor which makes use of a fine rain of inert solids falling down through the reaction zone, picking up the heat liberated in the reaction and carrying it out of the reaction zone.

It has now been discovered that feeds that could not be oxidized or that could be oxidized only at very high temperatures, i.e. above 1100° F., such as in the case of ethane, will react with molecular oxygen at a temperature below their oxidation threshold temperatures if a more easily oxidizable material is employed to initiate the reaction.

The process of the present invention is unique in that the initiator is utilized to start the reaction and once started, the reaction proceeds in the absence of additional initiator. This process is not applicable to other vapor phase partial oxidation methods in which no extensive backmixing occurs. In the so-called "initiated oxidations" in the prior art, the addition of the initiator must be continued throughout the reaction, otherwise the reaction stops. Moreover, it is usually necessary to employ large quantities of the initiator so that in effect it is part of the feed. In such processes there is considerable product contamination which makes separation and purification of the oxygenated products difficult and costly. These difficulties are not encountered in the present process because the initiator is not fed into the reactor once the reaction is proceeding smoothly.

In the reactor used to carry out the present invention, control of the reaction is maintained by continually backmixing and quenching the reacting mass with relatively cool incoming reactants while simultaneously removing reaction products from the reaction zone for final quenching. The cooler incoming reactants, in turn, are activated and reacted. The reaction may be further controlled by injecting fine sprays of water or an inert liquid or gaseous coolant directly into the reaction zone. The major advantages of the homogeneous reactor are its extreme mechanical simplicity, short residence time, i.e., about 0.01 to 10 seconds, and correspondingly high capacity or throughput. The homogeneous reactor also offers certain advantages in quenching, adiabatic operation and product selectivity.

In contrast to the raining solids reactor, the homogeneous reactor operates without solids flow. A preheated oxygen-containing gas, e.g. air or molecular oxygen, and hydrocarbons are premixed, and fed into the reactor chamber of a reaction vessel together with a triggering agent at very high velocities, i.e., a linear gas velocity of about 10 to 5000 ft./second, through a series of tubular conduits which are preferably nozzles or quills projecting into the reaction chamber and having a plurality of orifices. Preferably the oxidant and hydrocarbons are mixed in a mixing chamber by the action of hydrocarbon jets impinging into the oxidant stream.

With an easily oxidizable feed, the reaction may be initiated by preheating the reaction vessel by a conventional heating means, e.g. by introducing a spark or a small hydrogen flame into the reaction chamber or heating the walls of the reaction chamber by electrical resistance means. However, when the feed is difficultly oxidizable or cannot be oxidized under commercially feasible conditions, resort should be made to the use of easily oxidizable materials in accordance with the present invention. When this method is used, the triggering agent is introduced directly into the reaction chamber to contact the incoming reactants preheated to the oxidation threshold temperature of the triggering agent. Once the reaction commences, the temperature can be lowered far below the initial reaction temperature caused in part by the oxidation of the triggering agent while still maintaining a high conversion without the further addition of the triggering agent.

A suitable reactor for carrying out the present process is shown in the accompanying drawings.

FIGURE I is a sectional view of the apparatus taken along the line A—A in FIGURE II.

FIGURE II is a sectional view of the same apparatus taken along line B—B in FIGURE I.

The reaction vessel may be a relatively small housing having a curved or polygonal internal surface that will permit the gaseous reactants to swirl in a generally circular concurrent motion. The reactor operates most efficiently when the conduits are so positioned as to concurrently discharge the streams of gaseous mixture tangentially to the path of the swirling mixture to impart to said mixture the desired constantly swirling motion. The gases swirl past each nozzle orifice and are continually mixed with the cooler fresh reactants which tend to serve as a brake on the reaction. Additional tubular nozzles or coolant conduits having a plurality of orifices may be used to release a spray of water or an inert liquid or gaseous coolant directly into the reaction chamber to aid in temperature control or the reaction vessel itself may be immersed in a coolant.

Exit means are provided through which the products of reaction are continuously removed from the reaction vessel by virtue of the pressure drop across the reactor.

In a reactor of the type just described certain opposing forces must be recognized and controlled. To obtain short residence times and at the same time provide adequate backmixing to self-perpetuate and control the reaction, definite relationships must be maintained between the location of reactant inlets, movements of the reactants in the reaction chamber and the location of exit means. It is therefore critical to properly position the inlets and exits. If, for instance, the exit is located too close to the wall surface first contacted by reactants leaving the reactant inlets, low residence times may be maintained but adequate backmixing will not be accomplished. If, on the other hand, the location of the exit openings causes excessive backmixing, the residence time increases and there is a corresponding loss of product selectivity. The exit means in the homogeneous reactor is, therefore, centrally positioned in relation to a surface other than the concave surface first contacted by reactants leaving the reactant inlets. The reactant inlets are spaced away from both the aforesaid concave surface and the exit means and positioned so as to substantially circumscribe the exit means and/or a major axis thereof. A highly suitable reactor is one in which the products are removed via a tubular exit means positioned in accordance with the foregoing and which communicates with the central portion of the reaction chamber into which the reactants and reaction products spiral toward a vortex before leaving via the exit means.

In accordance with the present invention, about 1 to 100 mole percent (based on the reactant feed) of a more easily oxidizable organic substance is used to initiate partial oxidation reactions in the above-described homogeneous reactor. Even when relatively small amounts, e.g. 10 to 50 mole percent, of the more easily oxidizable substance or triggering agent are used to initiate the reaction, it is possible to lower the oxidation threshold temperature of the reactant up to several hundred degrees. By means of the present invention, a feed, such as ethane, can be partially oxidized with molecular oxygen, e.g. air, under controlled conditions far below its normal oxidation threshold temperature.

The oxidation initiator triggers the vapor phase reaction and thereafter the reaction continues without the initiator. The reaction is sustained because the contents of the reactor are well mixed and therefor the free radicals that are formed can propagate the reaction. The reaction temperature generally rises substantially during the initiation period, which is usually no more than a few minutes, due to the vigorous oxidation of the triggering agent. Thereafter the triggering agent is shut off and the reaction mixture is cooled until optimum selectivity and conversion are obtained. The final temperature is normally several hundred degrees below the normal oxidation threshold temperature of the reactant.

The present invention has two principal advantages, namely it allows one to partially oxidize feeds that are otherwise hard to oxidize at lower temperatures and provides a method wherein the products are not contaminated by the triggering agent or its oxidation products.

The selection of the triggering agent depends mainly upon the reactant and the process conditions. Generally speaking, moderately high molecular weight straight and branched chain paraffins and olefins are excellent initiators, especially for low molecular weight paraffins and olefins. Among the olefins and paraffins suitable for use as initiators are $C_5$ to $C_{10}$ olefins such as heptene-1, pentene-2, 2-methyl hexene-1, nonene-1 and decene-1, and $C_5$ to $C_{10}$ paraffins such as n-hexane, isooctane, n-decane and n-heptane. The preferred olefins and paraffins have 6 to 8 carbons, e.g. n-hexane.

In addition to the hydrocarbon initiators listed above, organic oxygen-containing compounds containing 1 to 6 carbon atoms are also useful. For example, $C_1$ to $C_4$ primary aliphatic saturated alcohols, such as methanol, ethanol and butanol, can be used to trigger certain partial oxidation reactions. Carbonyl compounds, such as $C_2$ to $C_6$ aldehydes and ketones are also effective in the present process. Among the aliphatic saturated ketones and aldehydes that can be utilized to trigger reactions are acetaldehyde, butyraldehyde, acetone, methylethyl ketone, n-valeraldehyde and caproaldehyde.

The more difficultly oxidizable feeds include the low molecular weight paraffins and olefins, as well as the unsubstituted cyclic paraffins and aromatics. Generally, the feeds do not contain compounds having more than 10 or 12 carbon atoms.

Paraffins, both straight chain and branched, containing up to 4 carbon atoms per molecule are usually quite difficult to oxidize without resorting to very high pressures and temperatures. This is especially true of methane, ethane and propane, and to a lesser extent of butane and isobutane.

Among the olefin feeds that can be oxidized in accordance with the present invention are the $C_2$ to $C_4$ compounds, such as ethylene and the butenes.

Suitable cycloparaffin feeds include $C_3$ to $C_6$ hydrocarbons such as cyclopropane, cyclopentane and cyclohexane. Aromatics, such as benzene, and methylated aromatics, e.g. toluene, xylenes, durene and mesitylene, are also not easily oxidizable and therefore can be used as feeds in the present process.

The oxidant is usually a dilute oxygen stream, such as air or oxygen mixed with nitrogen. The oxidant-hydrocarbon feed molar ratio should be maintained between about 0.1 to 5:1.

The reaction time is conrolled by the rate of throughput. The degree of conversion per pass, the amount of preheating involved and the employment of extraneous coolants all affect the temperature. Pressure is controlled by throttling or exhausting the exit line. For a given oxidant/hydrocarbon ratio, an optimum time-temperature-pressure combination can be selected to give high oxygen utilization per pass while minimizing the formation of carbon oxides and water. Once the reaction is triggered less preheating is necessary. At low conversions the reaction temperature can be controlled by feed temperature, i.e. the heat of reaction can be dissipated by heating the fresh feed to reaction temperature.

As soon as the oxidation is triggered, the residence time is decreased to the desired level. For instance, residence times of about 0.05 to 3.0 seconds have been found suitable after the oxidation of low molecular weight paraffins has been triggered with n-hexane. Residence times of 0.6 to 2.0 seconds are preferred. Once the addition of the triggering agent is ceased, the reaction is allowed to proceed at temperatures of about 500 to about 1000° F., preferably 600 to 800° F., and the initial residence time is reduced, e.g. from about 1 to 10 seconds to about 0.05 to 3 seconds. The hot swirling reactants are continuously mixed with the cooler incoming reactants preheated to about the aforementioned temperatures. When additional cooling is desired, fine sprays of water or an inert liquid or gaseous coolant may be introduced into the reaction chamber. The reactor may be operated with pressures of about 0 to 500 p.s.i.g., preferably 40 to 100 p.s.i.g., in the reaction chamber. However, for proper mixing and throughput, the feed should be introduced under pressure, i.e. at least 20 p.s.i.g. Superatmospheric pressures are beneficial because they promote the oxidation and permit the use of even lower temperatures.

Referring now to FIGURES I and II in the accompanying drawing, the present process is carried out by initially introducing the feed and a small amount of a triggering agent, preheated to above the oxidation threshold temperature of the triggering agent but below the threshold temperature of the feed, into mixing chamber 2 via a perforated tube 1. Any suitable means for injecting a large number of small gaseous streams into the mixing chamber may be employed. The gaseous feed leaving tube 1 impinges on and admixes with a stream of air preheated to the aforementioned temperature, which stream enters chamber 2 via oxidant inlet 3. The mixed gases then pass into a series of multi-orifice nozzles 5 that communicate with chamber 2 and project into reaction chamber 4 which is formed by a curved or concave wall 10 and flat walls 11 and 12. The feed nozzles 5 penetrate wall 12 and communicate with mixing chamber 2. Cooling liquid or gas, e.g. water, may be introduced into reaction chamber 4 through a plurality of multi-orifice cooling nozzles 6 which penetrate wall 11. A perforated cylinder 7 is centrally located in the reaction chamber 4 to regulate the flow of the reaction products leaving the reactor via exit tube 8. Quenching inlets 9 communicating with tube 8 are provided for introducing water or other liquid or gaseous quenching substances into the exit tube. Within a few seconds the temperature of the swirling reaction mixture commences to rise and after about 5 to 10 minutes the flow of the triggering agent into the reactor is stopped and the reaction is continued solely by the introduction of the feed and air at a temperature below the ordinary oxidation threshold of the feed.

The following examples provide a better understanding of the process.

EXAMPLE 1

Ethane cannot be partially oxidized with oxygen in the homogeneous reactor described above even at temperatures up to 1100° F. However, when the ethane oxidation is initiated with n-hexane, the partial oxidation reaction proceeds smoothly even at temperatures below 1000° F. at superatmospheric pressures. For instance, ethane conversions between 25 and 40% were obtained with substantially complete oxygen utilization at a pressure of 50 p.s.i.g. and a temperature of 940° F. when the reaction was triggered by continuously adding 25 mole percent n-hexane (based on the ethane) to the ethane-oxygen mixture until the reaction started and thereafter for about 5 to 10 minutes. Under these conditions about 25% of the ethane and 85% of the oxygen fed into the homogeneous reactor reacted. The reaction product consisted principally of ethylene and formaldehyde with some acetaldehyde and formic acid being formed.

The following is a series of runs carried out under various conditions showing the effect of reducing the final reaction temperature and increasing the pressure on the reaction products.

*Air Oxidation of Ethane in Homogeneous Reactor Triggered With 25 Mole Percent n-Hexane (Based on Ethane)*

[$O_2$/ethane mole ratio=0.5]

| Run No. | 1 | 2 | 3 | 4 |
|---|---|---|---|---|
| Pressure, p.s.i.g. | 20 | 20 | 50 | 50 |
| Temperature, °F. | 1,100 | 1,128 | 988 | 940 |
| Initial Residence Time, sec. | 2 | 2 | 2 | 2 |
| Final Residence Time, sec. | 0.74 | 0.73 | 1.50 | 1.55 |
| Conversions: | | | | |
| Ethane Conversion, wt. percent [1] | 37.7 | 43.1 | 29.8 | 25.6 |
| Oxygen Conversion, wt. percent | 99.6 | 100.0 | 99.3 | 86.7 |
| Moles $O_2$/Moles Ethane Reacted | 1.32 | 1.16 | 1.67 | 1.70 |
| Yields of Gaseous Products: | | | | |
| Moles Ethylene Made/Mole Ethane Reacted | 0.622 | 0.602 | 0.578 | 0.622 |
| Moles CO Made/Mole Ethane Reacted | 0.503 | 0.521 | 0.571 | 0.502 |
| Moles $CO_2$ Made/Mole Ethane Reacted | 0.202 | 0.193 | 0.258 | 0.299 |
| Yields of Liquid Products: | | | | |
| g. $H_2O$/g. Ethane Reacted | 0.490 | 1.653 | 2.000 | 2.051 |
| g. Liquid Organic Oxys/g. Ethane Reacted | 0.045 | 0.075 | 0.109 | 0.087 |
| Composition of Liquid Product: | | | | |
| g. Water/g. Product | 0.916 | 0.956 | 0.948 | 0.959 |
| g. Formaldehyde/g. Product | 0.059 | 0.031 | 0.025 | 0.023 |
| g. Acetaldehyde/g. Product | 0.024 | 0.005 | 0.017 | 0.010 |
| g. Formic Acid/g. Product | 0 | 0 | 0 | 0.033 |
| g. Acetic Acid/g. Product | 0 | 0 | 0 | 0 |
| g. Propionic Acid/g. Product | 0.016 | 0.006 | 0.044 | 0.014 |
| g. Ethanol/g. Product | | 0.007 | 0.009 | 0.007 |

[1] Based on carbon balance.

The data in the above table show that operating at lower temperatures and higher pressures increases the selectivity with respect to useful organic oxygenated products, such as formaldehyde, acetaldehyde and ethanol. These products, as well as ethylene which is also formed during the reaction, have a wide utilization in the chemical field as monomers, diluents, etc.

EXAMPLE 2

Isobutylene is not partially oxidized by air in the homogeneous reactor even at temperatures exceeding 1000° F. However, the partial oxidation of isobutylene proceeds smoothly at temperatures below 900° F. at an oxygen/isobutylene mole ratio of approximately 1 when the process is triggered with heptene-1. For example, a substantially complete conversion of oxygen is obtained at a pressure of 20 p.s.i.g. and a temperature of 820° F. when the reaction is triggered with 40 mole percent heptene-1 (based on the isobutylene). The initial residence time is about 2 seconds and the final residence time is about 1 second. Under these conditions, about 30% of the isobutylene and 90% of the oxygen in the air reacted. The reaction products are mainly water-soluble oxygenated products, such as isobutylene oxide and formaldehyde, and lower molecular weight olefins, such as ethylene and propylene. Water and some carbon oxides are also produced.

EXAMPLE 3

Propylene, which is difficult to oxidize in the homogeneous reactor even at temperatures exceeding 1100° F., can be partially oxidized with air at temperatures below 1000° F. when the reaction is triggered with methanol. For example, the oxygen (oxygen/propylene mole ratio is about 0.5) in the air supplied to the reactor is substantially completely converted at a pressure of 100 p.s.i.g. and a temperature of 920° F. when the oxidation is triggered with 5 mole percent methanol (based on the propylene). The initial residence time is about 2 seconds and the final residence time is about 1 second. Under these conditions, about 25% of the propylene and 80% of the oxygen in the air reacted. The reaction products are mainly acetaldehyde, propionaldehyde, formaldehyde and ethylene, with some acetone also produced.

The above-described method provides an efficient and inexpensive method for oxidizing those feeds which are otherwise difficult or impossible to oxidize. The triggering agent permits the use of lower temperatures which have been shown to favor selectivity to certain desirable oxygenated products and also increases throughput by reducing the residence time which would otherwise be necessary to oxidize some of the feeds. Perhaps the greatest advantage of the present process is that the triggering agent need not be fed to the reaction zone once the oxidation commences. That is to say, the triggering agent provides a condition under which the chain reaction is self-propagating even at moderately high temperatures.

It is not intended to restrict the present invention to the foregoing embodiment, but rather it should only be limited by the appended claims in which it is intended to claim all the novelty inherent in the invention.

What is claimed is:

1. In a process for oxidizing a hydrocarbon feed selected from the group consisting of $C_1$ to $C_4$ paraffin, $C_2$ to $C_4$ monoolefins, $C_3$ to $C_6$ cycloparaffins and aromatic hydrocarbons containing up to 10 carbon atoms in which the feed is mixed with molecular oxygen-containing gas and the resultant mixture is preheated to a temperature between about 500° and 1000° F. and continually passed into a reaction zone at a pressure between about 20 and 500 p.s.i.g. and at a linear gas velocity of about 10 to 5000 ft./second so as to impart a swirling motion to said mixture whereby fresh incoming feed is back-mixed with at least a portion of the oxidation product formed in said reaction zone and oxidation products are continuously withdrawn from said zone after a residence time therein of about 0.01 to 10 seconds, the improvement which comprises triggering the oxidation of said feed by initially introducing a triggering agent comprising a more easily oxidizable organic compound relative to said hydrocarbon feed and selected from the group consisting of $C_5$ to $C_{10}$ paraffins, $C_5$ to $C_{10}$ monoolefins, $C_1$ to $C_4$ organic alcohols, and $C_2$ to $C_6$ carbonyl compounds into said reaction zone at a temperature below the threshold oxidation temperature of said hydrocarbon feed but at least equal to the threshold oxidation temperature of said triggering agent, ceasing to introduce the triggering agent into the reaction zone after the hydrocarbon feed commences to oxidize and thereafter oxidizing said feed in the absence of additional triggering reagent at a temperature below the ordinary oxidation threshold temperature of said hydrocarbon feed.

2. A process according to claim 1 in which the triggering agent is n-hexane and the feed is a $C_1$ to $C_4$ paraffin.

References Cited in the file of this patent
UNITED STATES PATENTS

| | | |
|---|---|---|
| 2,018,994 | Burke et al. | Oct. 29, 1935 |
| 2,270,780 | Berl | Jan. 20, 1942 |
| 2,530,509 | Cook | Nov. 21, 1950 |
| 2,689,253 | Robertson et al. | Sept. 14, 1954 |
| 2,727,919 | Saunders | Dec. 20, 1955 |
| 2,769,846 | Di Nardo et al. | Nov. 6, 1956 |
| 2,974,173 | Long et al. | Mar. 7, 1961 |
| 2,981,747 | Lang et al. | Apr. 25, 1961 |